(12) United States Patent  
Deng

(10) Patent No.: US 9,906,258 B1  
(45) Date of Patent: Feb. 27, 2018

(54) ANTI-DROP MOBILE PHONE COVER WITH BUOYANCY

(71) Applicant: SHENZHEN XIWXI TECHNOLOGY CO., LIMITED, Shenzhen (CN)

(72) Inventor: Xiuhong Deng, Shenzhen (CN)

( * ) Notice: Subject to any disclaimer, the term of this patent is extended or adjusted under 35 U.S.C. 154(b) by 0 days.

(21) Appl. No.: 15/482,817

(22) Filed: Apr. 10, 2017

(51) Int. Cl.
  *H04B 1/3888* (2015.01)
  *H04M 1/02* (2006.01)

(52) U.S. Cl.
  CPC ........ *H04B 1/3888* (2013.01); *H04M 1/0202* (2013.01)

(58) Field of Classification Search
  CPC .......................... H04B 1/3888; H04M 1/0202
  See application file for complete search history.

(56) References Cited

U.S. PATENT DOCUMENTS

| 2013/0126533 A1* | 5/2013 | Klosky | B65D 25/00 220/560 |
| 2014/0028243 A1* | 1/2014 | Rayner | G06F 1/163 320/103 |

* cited by examiner

*Primary Examiner* — Tuan H Nguyen
(74) *Attorney, Agent, or Firm* — Prakash Nama; Global IP Services, PLLC

(57) ABSTRACT

The utility model discloses an anti-drop phone cover with buoyancy. The phone cover consists of a cover body and suspending members; the body is internally filled with a foam layer and externally provided with an anti-scratch layer and has two mounting holes respectively formed at two corners; the suspending members are respectively disposed in the mounting holes; an arc-shaped projection of the front end of each one of the suspending members is formed with a round hole for suspending phone accessories. The cover is internally filled with a foam layer which is disposed in the bottom face and four lateral faces of the body therefore has very high buoyancy. The cover body is externally provided with an anti-scratch layer and avoids scratches. The suspending members capable of suspending accessories are disposed at two corners of the body of the utility model, the suspending members are internally provided with two step portions.

8 Claims, 2 Drawing Sheets

ANTI-DROP MOBILE PHONE COVER WITH BUOYANCY

BACKGROUND OF THE INVENTION

The utility model relates to a mobile phone cover, in particular to an anti-drop mobile phone cover with buoyancy.

BRIEF SUMMARY OF THE INVENTION

Existing mobile phone covers are mainly classified into two types. One is a hard plastic cover and the other is a flexible rubber cover. The hard plastic cover has relatively high crush resistance, but generates a relatively low buffering effect when a mobile phone falls onto the ground from a high altitude. On the contrary, the flexible rubber cover has low crush resistance but generates a strong buffering effect. The two types of mobile phone covers both have no buoyancy, and can sink to the bottom when placed in water. Besides, the existing mobile phone cover also does not have suspending members for suspending mobile phone accessories.

Aiming at the defects in the prior art, the technical problem to be solved by the utility model is to provide an anti-drop mobile phone cover with buoyancy.

In order to solve the above technical problems, the utility model employs the following solution. An anti-drop mobile phone cover with buoyancy is provided. The mobile phone cover consists of a mobile phone cover body and mobile phone suspending members; wherein the mobile phone cover body is internally filled with a foam layer and externally provided with an anti-scratch layer; the mobile phone cover body has two mounting holes respectively formed at two corners; the mobile phone suspending members are respectively disposed in the mounting holes: and an arc-shaped projection of the front end of each one of the mobile phone suspending members is formed with a round hole for suspending mobile phone accessories.

Further, the foam layer is disposed in the bottom and four lateral faces of the mobile phone cover body.

Further, the anti-scratch layer is made of flexible rubber plastic materials.

Further, the mobile phone suspending members are integrally molded; the bottom of the part of each one of the mobile phone suspending members disposed in the corresponding one of the mounting holes is round; a convex arc body is disposed in the middle of the round part; round holes are formed on the lateral faces of the arc body; the part of each one of the mobile phone suspending members disposed in the mobile phone accommodating cavity of the mobile phone cover body is L-shaped; a step portion is formed on the inner side of the L-shaped portion; and the bottom bend of the L-shaped portion is a mobile phone supporting face.

Further, the mobile phone cover body is formed with a plurality of through-holes on the bottom face, and lateral holes on the left and right lateral faces.

Further, the through-holes and the lateral holes are all square tapered holes which gradually shrink from the outside to the inside.

Further, the mobile phone cover body is equipped with an ovaloid slot on the inner bottom face, and the ovaloid slot is internally embedded with a PC plate.

Further, the mobile phone cover body is formed with recesses on two lateral faces and projections at the edges of the back of the lateral faces.

Further, the mobile phone cover body is also formed with a round camera hole at the middle-upper part of the bottom face, and an ovaloid camera hole on the upper right corner of the bottom face.

Relative to the prior art, the utility model has the following beneficial effects. The mobile phone cover of the utility model is internally filled with a foam layer. The foam layer is disposed in the bottom face and four lateral faces of the mobile phone cover body and therefore has very high buoyancy. The mobile phone cover body is externally provided with an anti-scratch layer and avoids scratches. Mobile phone suspending members capable of suspending accessories are disposed at two corners of the mobile phone cover body of the utility model, so the mobile phone cover is convenient to use. The mobile phone suspending members are internally provided with two step portions such that the mobile phone cover can be applied to similar models. The outer layer of the mobile phone cover is combined with the interior foam layer, achieving an anti-drop effect.

DETAILED DESCRIPTION OF THE INVENTION

Preferred embodiments of the utility model are described in detail in conjunction with the attached drawings such that those skilled in the art can easily understand the advantages and characteristics of the utility model, thus more clearly defining the protective scope of the utility model.

Figure 1:
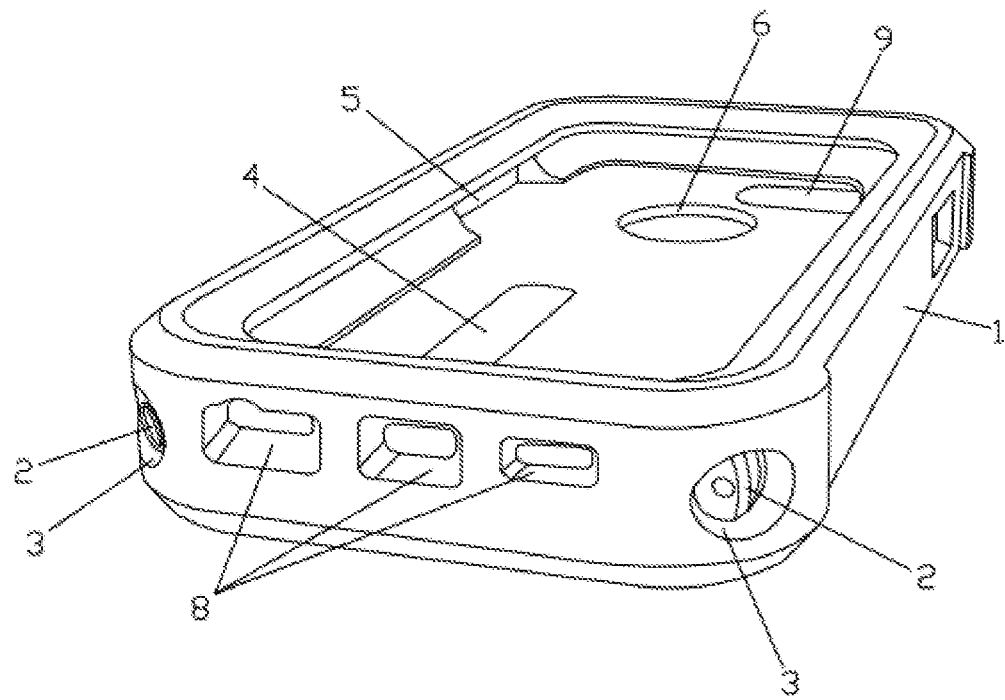
FIG. 1 is a structural view of a mobile phone cover of the utility model.
Figure 2:
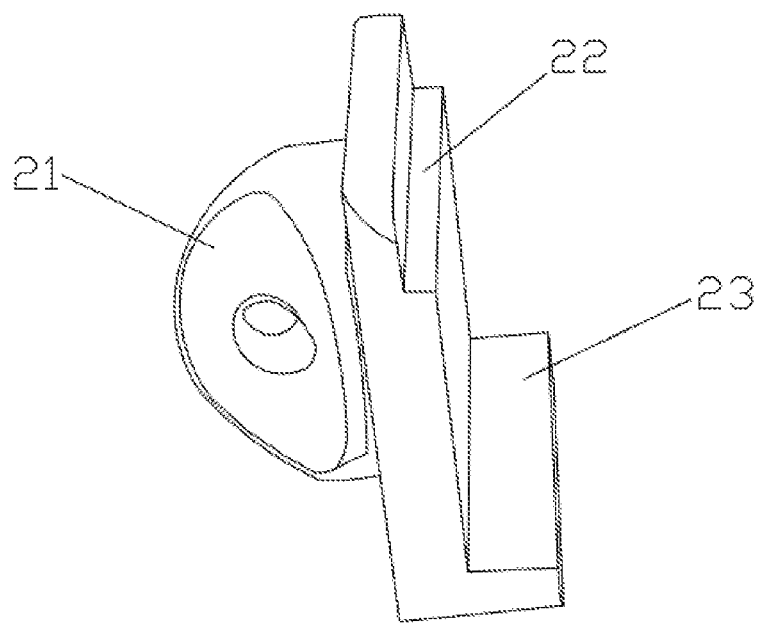
FIG. 2 is a structural view of a mobile phone suspending member of the utility model.
Figure 3:
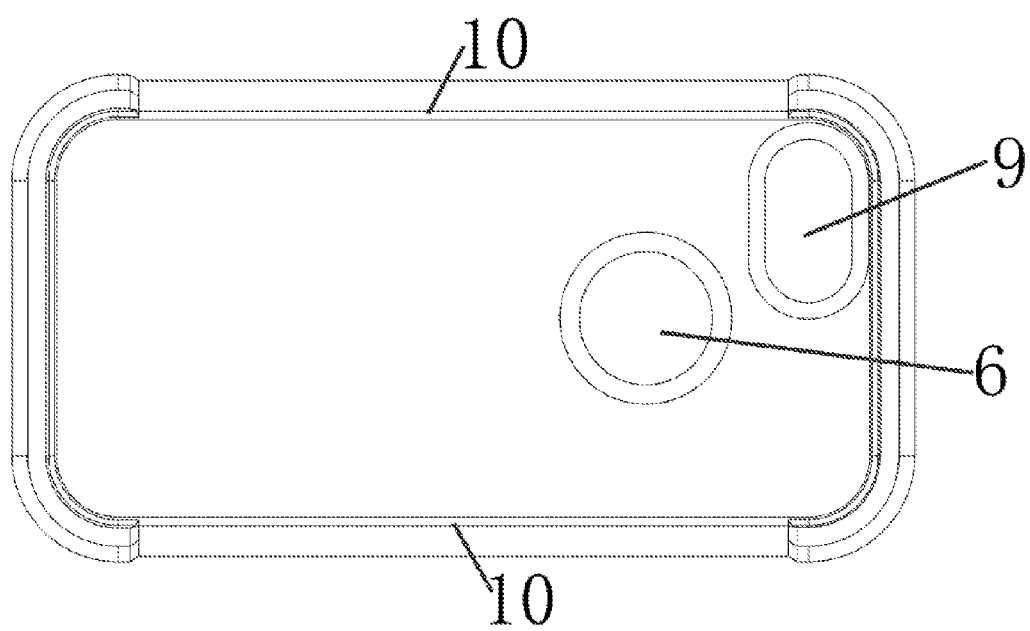
FIG. 3 is a structural view of the back face of the mobile phone cover of the utility model.

Refer to FIGS. 1-3. The utility model provides an anti-drop mobile phone cover with buoyancy. The mobile phone cover consists of a mobile phone cover body 1 and mobile phone suspending members 2; wherein the mobile phone cover body 1 is internally filled with a foam layer and externally provided with an anti-scratch layer; the mobile phone cover body 1 has two mounting holes 3 respectively formed at two corners; the mobile phone suspending members 2 are respectively disposed in the mounting holes 3; and an arc-shaped projection of the front end of each one of the mobile phone suspending members 2 is formed with a round hole for suspending mobile phone accessories.

The foam layer is disposed in the bottom and four lateral faces of the mobile phone cover body 1. The foam of the foam layer is common white foam on the market. Such foam has high buoyancy.

The anti-scratch layer is made of flexible rubber plastic materials.

The mobile phone suspending members 2 are integrally molded; the bottom of the part of each one of the mobile phone suspending members disposed in the corresponding one of the mounting holes 3 is round; a convex arc body 21 is disposed in the middle of the round part; round holes are formed on the lateral faces of the arc body; the part of each one of the mobile phone suspending members 2 disposed in the mobile phone accommodating cavity of the mobile phone cover body 1 is L-shaped; a step portion 22 is formed on the inner side of the L-shaped portion; and the bottom bend of the L-shaped portion is a mobile phone supporting face 23.

The mobile phone cover body 1 is formed with a plurality of through-holes 8 on the bottom face, and lateral holes 5 on the left and right lateral faces.

The through-holes 8 and the lateral holes 5 are all square tapered holes which gradually shrink from the outside to the inside.

The mobile phone cover body 1 is equipped with an ovaloid slot on the inner bottom face, and the ovaloid slot is internally embedded with a PC plate 4.

The mobile phone cover body 1 is formed with recesses on two lateral faces and projections at edges of the backs of the lateral faces.

The mobile phone cover body 1 is also formed with a round hole 6 at the middle-upper part of the bottom face, and an ovaloid camera hole 9 on the upper right corner of the bottom face.

The mobile phone cover of the utility model is internally filled with a foam layer. The foam layer is disposed in the bottom face and four lateral faces of the mobile phone cover body and therefore has very high buoyancy. The mobile phone cover body is externally provided with an anti-scratch layer and avoids scratches. Mobile phone suspending members capable of suspending accessories are disposed at two corners of the mobile phone cover body of the utility model, so the mobile phone cover is convenient to use. The mobile phone suspending members are internally provided with two step portions such that the mobile phone cover can be applied to similar models. The mobile phone cover of the utility model does not sink when placed in water.

The above are preferred embodiments of the utility model, and do not limit the patent scope of the utility model. All equivalent structures or equivalent flow changes made on the basis of the contents of the description and attached drawings of the utility model, or direct or indirect applications of the utility model to other related technical fields, should fall within the patent protection scope of the utility model.

What is claimed is:

1. An anti-drop mobile phone cover with buoyancy, characterized in that the mobile phone cover comprises a mobile phone cover body (1) and mobile phone suspending members (2);

wherein the mobile phone cover body (1) is internally filled with a foam layer, and externally provided with an anti-scratch layer;

the mobile phone cover body (1) has two mounting holes (3) respectively formed at two corners; the mobile phone suspending members (2) are respectively disposed in the mounting holes (3); and an arc-shaped projection of the front end of each one of the mobile phone suspending members (2) is formed with a round hole for suspending mobile phone accessories;

the mobile phone suspending members (2) are integrally molded: the bottom of the part of each one of the mobile phone suspending members disposed in the corresponding one of the mounting holes (3) is round: a convex arc body (21) is disposed in the middle of the round part; round holes are formed on the lateral faces of the arc body; the part of each one of the mobile phone suspending members (2) disposed in the mobile phone accommodating cavity of the mobile phone cover body (1) is L-shaped: a step portion (22) is formed on the inner side of the L-shaped portion; and the bottom bend of the L-shaped portion is a mobile phone supporting face (23).

2. The anti-drop mobile phone cover with buoyancy according to claim 1, wherein the foam layer is disposed at the bottom and four lateral sides of the mobile phone cover body (1).

3. The anti-drop mobile phone cover with buoyancy according to claim 1, wherein the anti-scratch layer is made of flexible rubber plastic materials.

4. The anti-drop mobile phone cover with buoyancy according to claim 1, wherein the mobile phone cover body (1) is formed with a plurality of through-holes (8) on the bottom face, and lateral holes (5) on the left and right lateral faces.

5. The anti-drop mobile phone cover with buoyancy according to claim 4, wherein the through-holes (8) and the lateral holes (5) are all square tapered holes which gradually shrink from the outside to the inside.

6. The anti-drop mobile phone cover with buoyancy according to claim 1, wherein the mobile phone cover body (1) is equipped with an ovaloid slot on the inner bottom face, and the ovaloid slot is internally embedded with a PC plate (4).

7. The anti-drop mobile phone cover with buoyancy according to claim 1, wherein the mobile phone cover body (1) is formed with recesses on two lateral faces and projections (10) at the edges of the back of the lateral faces.

8. The anti-drop mobile phone cover with buoyancy according to claim 1, wherein the mobile phone cover body (1) is also formed with a round hole (6) at the middle-upper part of the bottom face, and an ovaloid camera hole (9) on the upper right corner of the bottom face.

* * * * *